(12) United States Patent  
Hosseini et al.

(10) Patent No.: US 12,185,148 B2
(45) Date of Patent: Dec. 31, 2024

(54) PHYSICAL UPLINK CONTROL CHANNEL TRANSMISSION FOR LOW LATENCY COMMUNICATION DEPLOYMENTS

(71) Applicant: QUALCOMM Incorporated, San Diego, CA (US)

(72) Inventors: Seyedkianoush Hosseini, San Diego, CA (US); Enoch Shiao-Kuang Lu, San Diego, CA (US); Peter Gaal, San Diego, CA (US); Wei Yang, San Diego, CA (US); James Beckman, La Jolla, CA (US); Aamod Khandekar, San Diego, CA (US); Pranay Sudeep Rungta, San Diego, CA (US); Seyed Ali Akbar Fakoorian, San Diego, CA (US); Danh Huu Hoang Nguyen, Stow, MA (US)

(73) Assignee: QUALCOMM Incorporated, San Diego, CA (US)

(*) Notice: Subject to any disclaimer, the term of this patent is extended or adjusted under 35 U.S.C. 154(b) by 330 days.

(21) Appl. No.: 17/303,217

(22) Filed: May 24, 2021

(65) Prior Publication Data

US 2021/0377767 A1 Dec. 2, 2021

Related U.S. Application Data

(60) Provisional application No. 63/030,263, filed on May 26, 2020.

(51) Int. Cl.
*H04W 24/10* (2009.01)
*H04W 24/08* (2009.01)
(Continued)

(52) U.S. Cl.
CPC ............ *H04W 24/10* (2013.01); *H04W 24/08* (2013.01); *H04B 7/0456* (2013.01); *H04L 1/0003* (2013.01)

(58) Field of Classification Search
CPC ....... H04W 24/10; H04W 24/08; H04W 8/24; H04B 7/0456; H04L 1/0003;
(Continued)

(56) References Cited

U.S. PATENT DOCUMENTS

2020/0295810 A1* 9/2020 Baldemair ............ H04L 1/1822
2021/0266941 A1* 8/2021 Park .................... H04L 27/2607
(Continued)

FOREIGN PATENT DOCUMENTS

CN 107925523 A 4/2018
WO 2020026295 A1 2/2020

OTHER PUBLICATIONS

3GPP TSG RAN WG1 #100bis, e-Meeting, Apr. 20-24, 2020, ZTE, "Discussion on UE feature for URLLC/IIoT", R1-2001632 (Year: 2020).*

(Continued)

*Primary Examiner* — Walli Z Butt
*Assistant Examiner* — Thad N Defauw
(74) *Attorney, Agent, or Firm* — QUALCOMM Incorporated

(57) ABSTRACT

Various aspects of the present disclosure generally relate to wireless communication. In some aspects, a wireless communication device may determining a physical uplink control channel (PUCCH) transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot hybrid automatic repeat request (HARQ) acknowledge- (Continued)

ment (ACK) codebook; and reporting information identifying the PUCCH characteristic for a plurality of types of symbol codebooks. Numerous other aspects are provided.

30 Claims, 8 Drawing Sheets

(51) Int. Cl.
 *H04B 7/0456* (2017.01)
 *H04L 1/00* (2006.01)
(58) Field of Classification Search
 CPC ... H04L 1/1861; H04L 1/1664; H04L 1/1671; H04L 1/1864
 See application file for complete search history.

(56) References Cited

U.S. PATENT DOCUMENTS

2022/0167320 A1* 5/2022 Lee ................. H04L 1/1896
2023/0048080 A1* 2/2023 Takahashi ......... H04W 72/1263

OTHER PUBLICATIONS

International Search Report and Written Opinion—PCT/US2021/070603—ISA/EPO—Sep. 13, 2021.
NTT Docomo, et al., "Rel-16 UE Features for URLLC", 3GPP Draft, 3GPP TSG RAN WG1 #101, R1-2004405, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020 (May 15, 2020), XP051886143, 4 Pages, Retrieved from the Internet: URL: https://ftp.3gpp.org/tsg_ran/WG1_RL1/TSGR1_101-e/Docs/R1-2004405.zip. R1-2004405 7.2.11.5 UE feature.docx [Retrieved on May 15, 2020] the whole document.
ZTE: "Discussion on UE Feature for URLLC/IIoT", 3GPP Draft, 3GPP TSG RAN WG1 #100bis, R1-2001632, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 24, 2020, Apr. 11, 2020 (Apr. 11, 2020), XP051875221, 10 Pages, Retrieved from the Internet: URL: https://ftp.3gpp.org/tsg_ran/WG1_RL1/TSGR1_100b_e/Docs/R1-2001632.zip. R1-2001632 Discussion on UE Feature for URLLC&IIoT.docx [Retrieved on Apr. 11, 2020] the whole document.

* cited by examiner

PHYSICAL UPLINK CONTROL CHANNEL TRANSMISSION FOR LOW LATENCY COMMUNICATION DEPLOYMENTS

CROSS-REFERENCE TO RELATED APPLICATION

This Patent Application claims priority to U.S. Provisional Patent Application No. 63/030,263, filed on May 26, 2020, entitled "PHYSICAL UPLINK CONTROL CHANNEL TRANSMISSION FOR LOW LATENCY COMMUNICATION DEPLOYMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel transmission for low latency communication deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes determining a physical uplink control channel (PUCCH) transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot hybrid automatic repeat request (HARD) acknowledgement (ACK) codebook; and reporting information identifying the PUCCH characteristic for a plurality of types of symbol codebooks.

In some aspects, a wireless communication device for wireless communication includes a memory; and one or more processors operatively coupled to the memory, the memory and the one or more processors configured to determine a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook; and report information identifying the PUCCH characteristic for a plurality of types of symbol codebooks.

In some aspects, a non-transitory computer-readable medium storing one or more instructions for wireless communication includes one or more instructions that, when executed by one or more processors of a wireless communication device, cause the one or more processors to: determine a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook; and report information identifying the PUCCH characteristic for a plurality of types of symbol codebooks.

In some aspects, an apparatus for wireless communication includes means for determining a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook; and means for reporting information identifying the PUCCH characteristic for a plurality of types of symbol codebooks.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
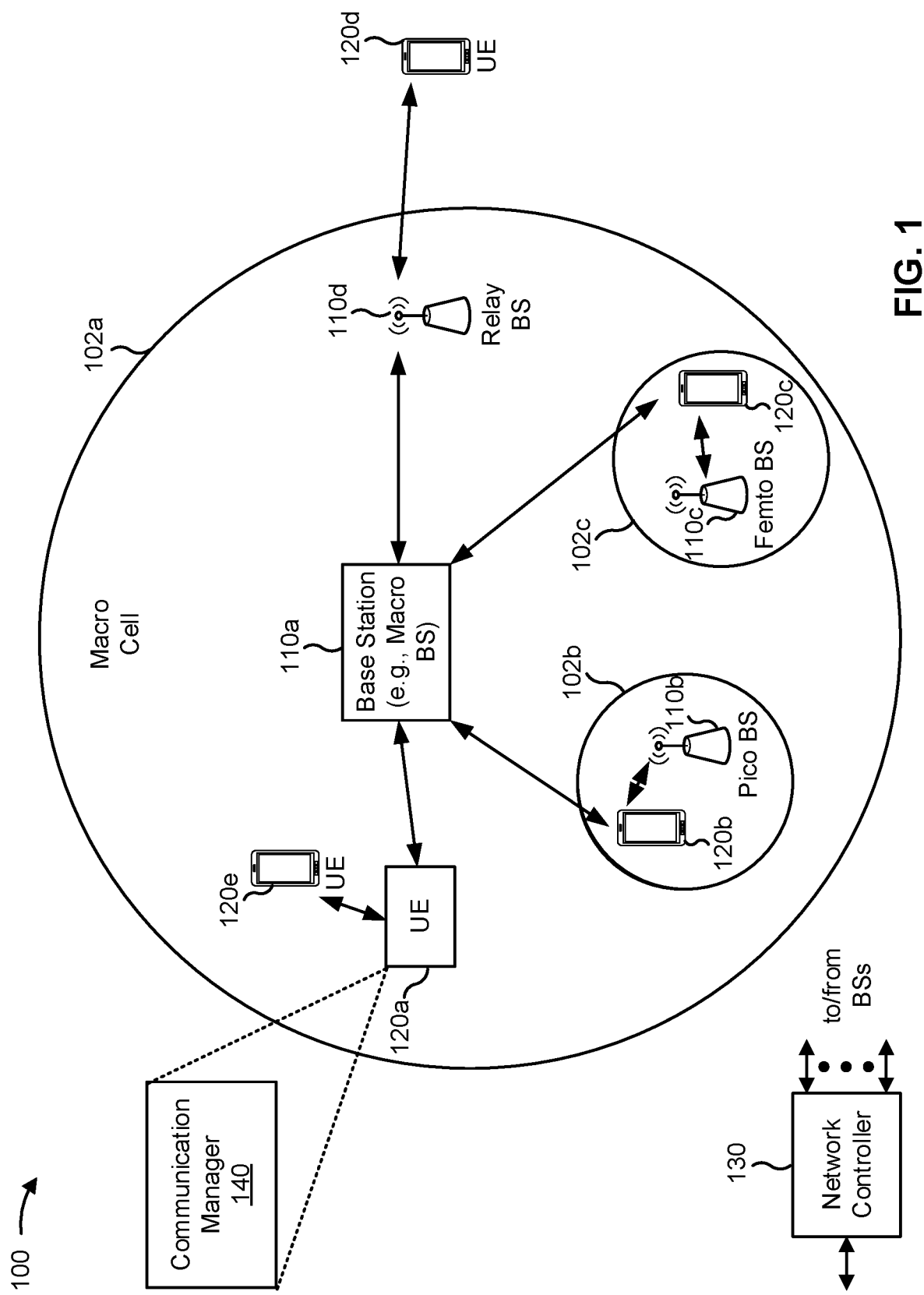
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a wireless communication device, such as a UE, may include a communication manager 140. As described in more detail elsewhere herein, the communication manager 140 may determine a physical uplink control channel (PUCCH) transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot hybrid automatic repeat request (HARD) acknowledgement (ACK) codebook; and report information identifying the PUCCH characteristic for a plurality of types of symbol codebooks. Additionally, or alternatively, the communication manager 140 may perform one or more other operations described herein.

As indicated above, FIG. 1 is provided as an example. Other examples may differ from what is described with regard to FIG. 1.

Figure 2:
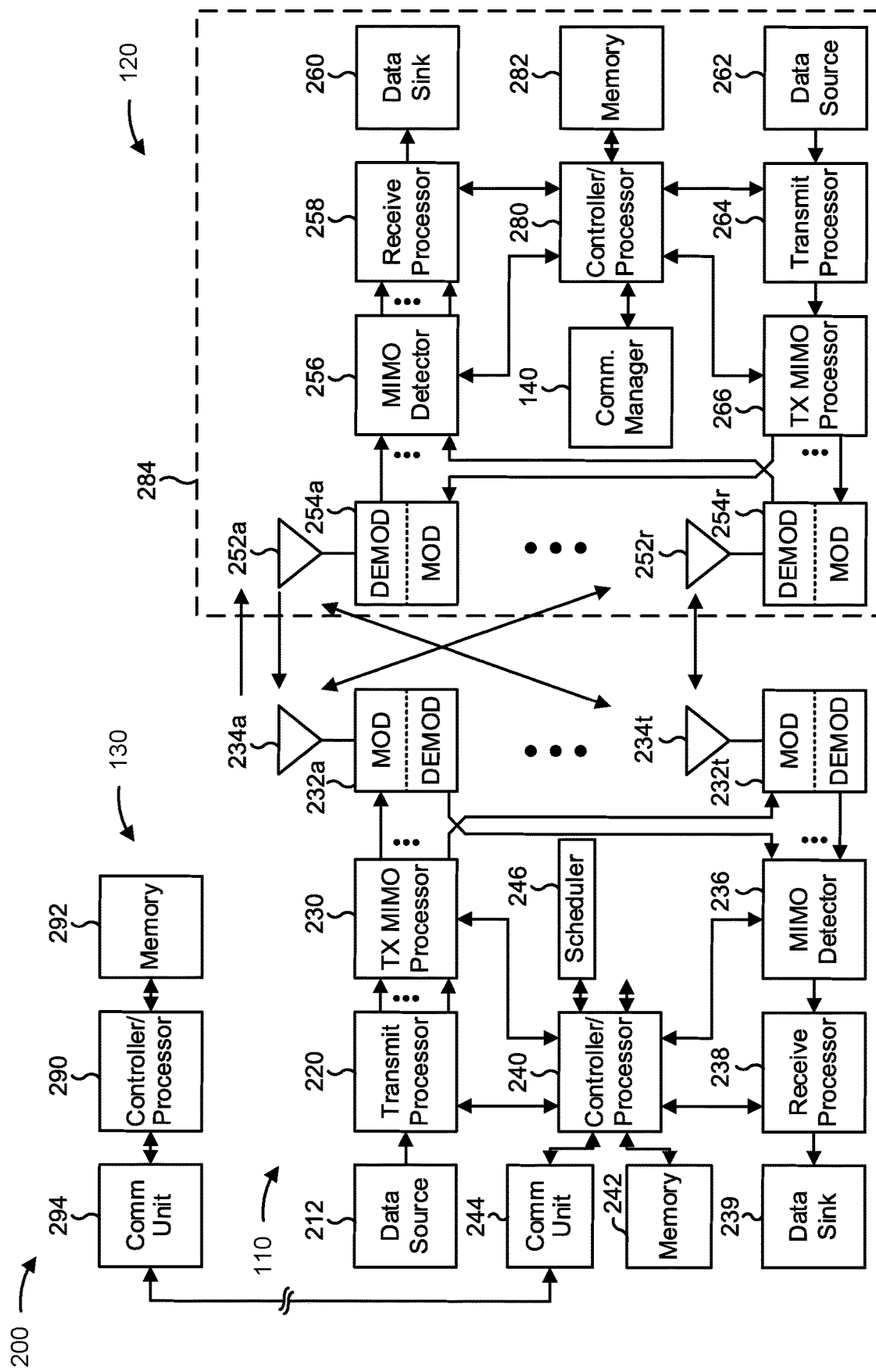
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-7).

Controller/processor 240 of base station 110, controller/processor 280 of UE 120, and/or any other component(s) of FIG. 2 may perform one or more techniques associated with PUCCH transmission for low latency communication deployments, as described in more detail elsewhere herein. In some aspects, the wireless communication device described herein is the UE 120 or includes one or more components of the UE 120 shown in FIG. 2. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the wireless communication device includes means for determining a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook; and/or means for reporting information identifying the PUCCH characteristic for a plurality of types of symbol codebooks. In some aspects, the means for the wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
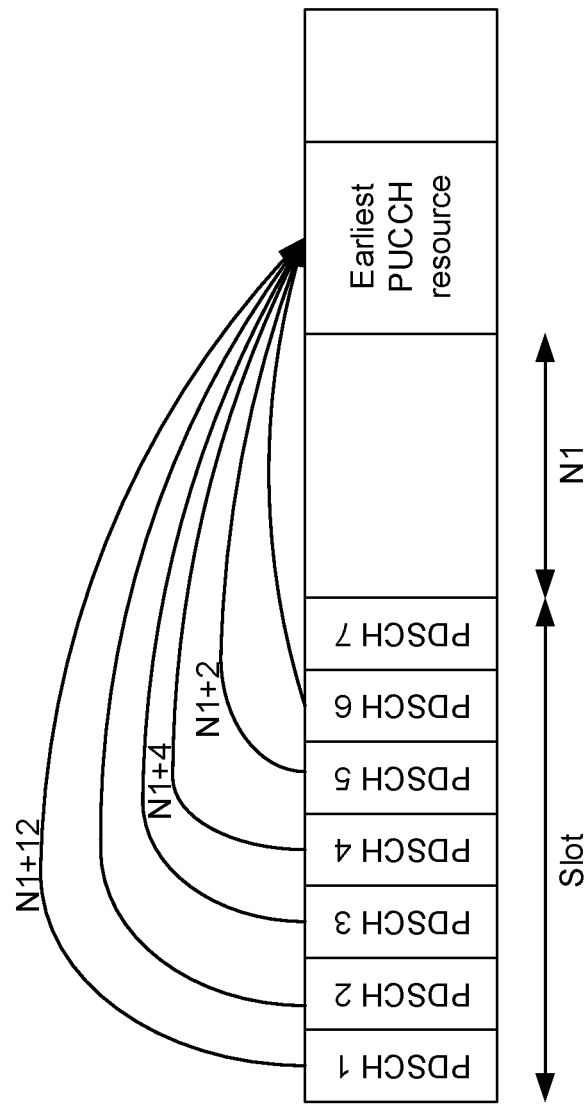
FIG. 3 is a diagram illustrating an example of hybrid automatic repeat request (HARQ) reporting, in accordance with the present disclosure.

FIG. 3 is a diagram illustrating an example 300 of HARQ reporting, in accordance with the present disclosure.

As shown in FIG. 3, resources of a slot may be assigned for a plurality of physical downlink shared channel (PDSCH) transmissions. For example, a base station may transmit a PDSCH 1 in a first resource of a slot, a PDSCH 2 in a second resource of a slot, or a PDSCH 3 in a third resource in a slot, among other PDSCHs. A UE may be scheduled with a PUCCH resource for reporting HARQ feedback relating to the plurality of PDSCH transmissions. For example, the UE may be configured with the PUCCH resource a time N1 after an end of the slot. In this case, the UE may report HARQ feedback with a particular delay based at least in part on where, in a slot, a PDSCH, to which the HARQ feedback applies, is received. For example, the UE may report HARQ feedback for PDSCH1 at a time N1+12 symbols after PDSCH1 and may report HARQ feedback for PDSCH5 at a time N1+2 symbols after PDSCH5.

The PUCCH resource may be configured for many-to-one mapping. In other words, each of the PDSCHs may map to a single PUCCH. This many-to-one mapping of PDSCHs to PUCCH resources can cause an excess latency for a round trip time (RTT) associated with a base station transmission of a PDSCH and a base station reception of a PUCCH including HARQ feedback for the PDSCH. For example, in a worst case scenario, a base station experiences an RTT of N1+12 symbols to receive HARQ feedback for PDSCH1. In contrast, the base station experiences an RTT of N1 symbols to receive HARQ feedback for PDSCH7. In contrast, in other communications systems for which one-to-one mapping of PDSCHs to PUCCHs is configured, a base station may experience the same RTT in a worst-case scenario, best-case scenario, and average scenario (e.g., each PDSCH has a corresponding PUCCH resource N1 symbols later).

As indicated above, FIG. 3 is provided as an example. Other examples may differ from what is described with respect to FIG. 3.

Figure 4:
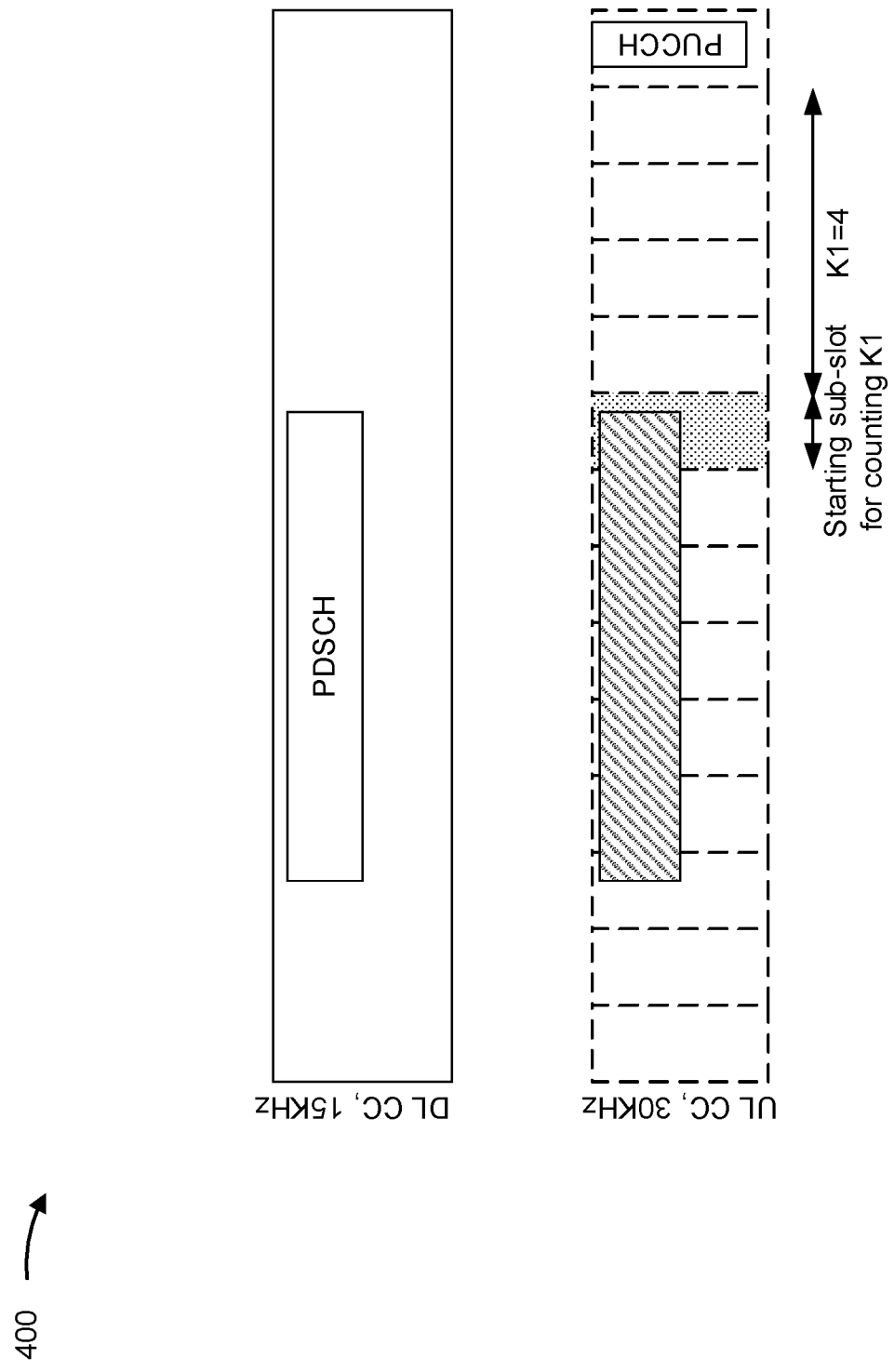
FIG. 4 is a diagram illustrating an example of HARQ reporting, in accordance with the present disclosure.

FIG. 4 is a diagram illustrating an example 400 of HARQ reporting, in accordance with the present disclosure.

As shown in FIG. 4, a UE is configured with a PDSCH resource on a downlink (DL) component carrier (CC), which has a first subcarrier spacing (SCS) (e.g., 15 kilohertz (kHz)). Additionally, the UE is configured with a PUCCH resource reserved on an uplink (UL) CC, which has a second SCS (e.g., 30 kHz). If a UE is provided with a parameter identifying a sub-slot length for the PUCCH resource (sub-slotLength-ForPUCCH), two codebook configurations may be possible. A first codebook configuration may have 2 sub-slots that each include 7 symbols. A second codebook may have 7 sub-slots that each include 2 symbols.

As further shown in FIG. 4, the PUCCH resource may occur K1 sub-slots after an end of the PDSCH resource. A size of the parameter K1 may be based at least in part on a sub-slot length configured for a codebook (e.g., a HARQ ACK codebook), and K1 may start in a sub-slot after a sub-slot that includes an ending symbol of the PDSCH resource.

As indicated above, FIG. 4 is provided as an example. Other examples may differ from what is described with respect to FIG. 4.

Figure 5:
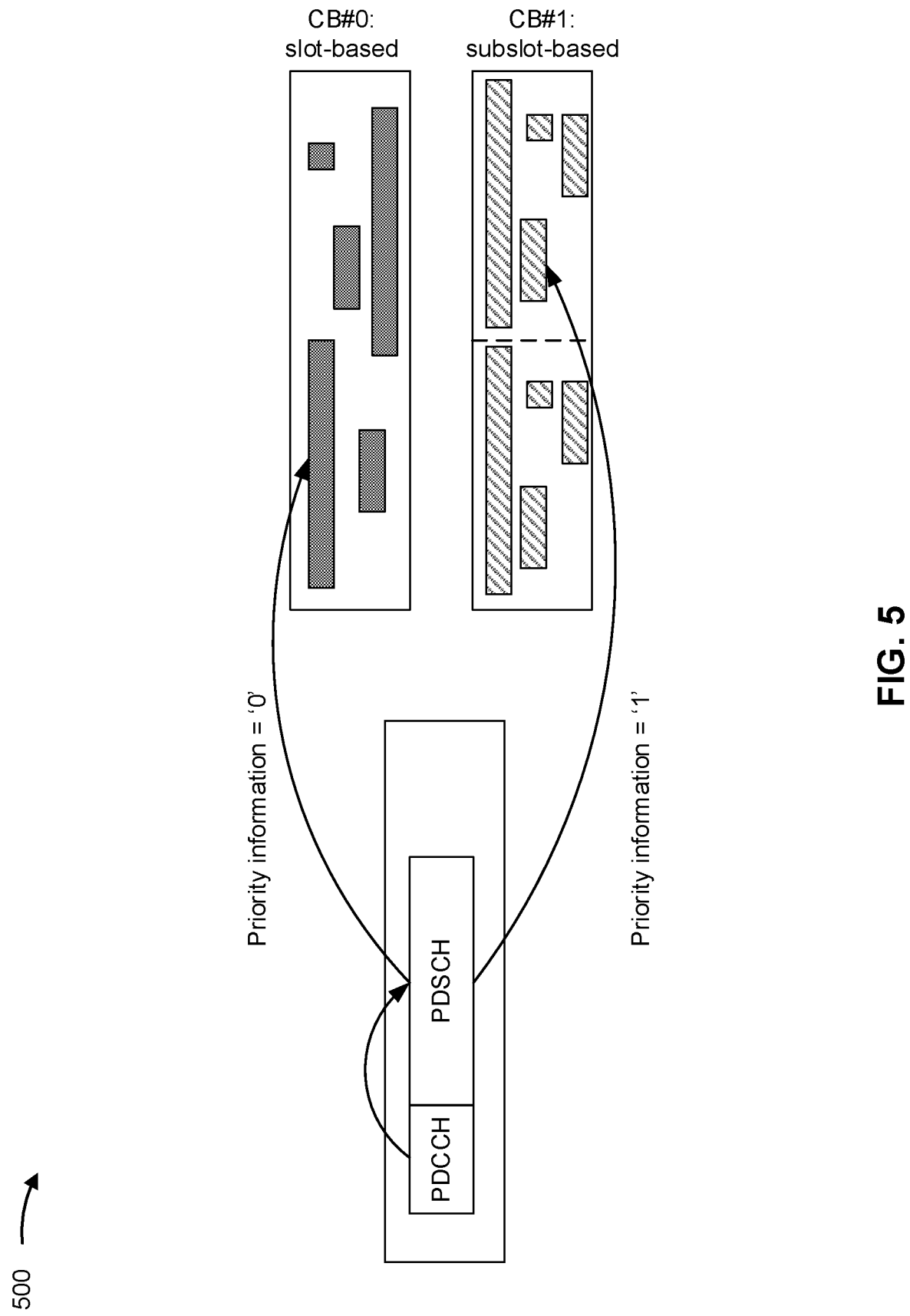
FIG. 5 is a diagram illustrating an example of HARQ codebooks, in accordance with the present disclosure.

FIG. 5 is a diagram illustrating an example 500 of HARQ codebooks, in accordance with the present disclosure.

As shown in FIG. 5, a physical downlink control channel (PDCCH) resource may schedule a PDSCH resource, which may be acknowledged in a reserved PUCCH resource. A UE may be configured with, for example, up to two codebooks (e.g., HARQ ACK codebooks) for the PUCCH resource. For example, the UE may be configured with two slot-based codebooks, two sub-slot based codebooks, or one slot-based codebook and one sub-slot based codebook.

As further shown in FIG. 5, a priority indicator field in downlink control information (DCI) may indicate which codebook a UE is to use for identifying a resource to transmit HARQ feedback. For example, the UE may identify priority information with a first value ('0'), which may indicate use of a slot-based codebook (CB #0) and a first resource for transmitting HARQ feedback. Additionally, or alternatively, the UE may identify priority information with a second value ('1'), which may indicate use of a sub-slot based codebook (CB #1) and a second resource for transmitting HARQ feedback. In some cases, when a priority indicator is not configured (and there is no priority information), a UE may assume a default codebook (e.g., a sequentially first codebook among a pair of codebooks).

As indicated above, FIG. 5 is provided as an example. Other examples may differ from what is described with respect to FIG. 5.

As described above, for some UEs only a single HARQ ACK report is allowed in each slot. Although a plurality of PDSCHs may be scheduled in a slot, a lack of one-to-one mapping between PDSCHs and PUCCHs may limit HARQ ACK reporting to a single instance in a slot. In some other communications systems, a plurality of codebook configurations are enabled, such as a first codebook configuration with 2 sub-slots, each sub-slot including 7 symbols (a 2×7-symbol codebook) or a second codebook configuration with 7 sub-slots, each sub-slot including 2 symbols (a 7×2-symbol codebook), among other examples.

A wireless communication device, such as a UE, may be configured with up to two codebooks (e.g., HARQ ACK codebooks), such as two slot-based HARQ ACK codebooks, two sub-slot-based HARQ ACK codebooks, or a slot-based HARQ ACK codebook and a sub-slot-based HARQ ACK codebook. Defined capabilities of the wireless communication device may support a single codebook or two codebooks for a single PUCCH conveying a HARQ ACK in a sub-slot.

However, in some cases, the wireless communication device may be configured to transmit other PUCCHs in addition to a PUCCH conveying a HARQ ACK. For example, the wireless communication device may be configured to transmit a scheduling request (SR) or channel state information (CSI). Moreover, the wireless communication device may be configured to multiplex a plurality of PUCCHs or a PUCCH and a physical uplink shared channel (PUSCH), among other examples.

Some aspects described herein define behavior of a wireless communication in a sub-slot deployment where the UE is to transmit a plurality of PUCCHs or multiplex a PUCCH with another uplink communication (e.g., a PUSCH), among other examples. For example, a feature group (FG) is defined to support a 2×7-symbol codebook and a 7×2 symbol codebook with a single PUCCH transmission per sub-slot and a set of formats for a plurality of length configurations. Additionally, or alternatively, the wireless communication device may, based at least in part on a set of supported codebooks, report a PUCCH transmission characteristic (e.g., a quantity of PUCCH transmissions per sub-slot and/or a set of formats of PUCCHs in a sub-slot) for a plurality of codebooks (e.g., the 2×7-symbol codebook and/or the 7×2-symbol codebook). In this case, the wireless communication device may jointly or separately report the PUCCH transmission characteristic for the plurality of codebooks based at least in part on a type of supported HARQ ACK codebook and/or, in some cases, based at least in part on whether a sub-slot-based HARQ ACK codebook is associated with a 2×7-symbol configuration or a 7×2-symbol configuration. In this way, the wireless communication device enables improved communication, reduced latency for HARQ ACK transmission, flexibility of communication deployments, and/or the like.

Figure 6:
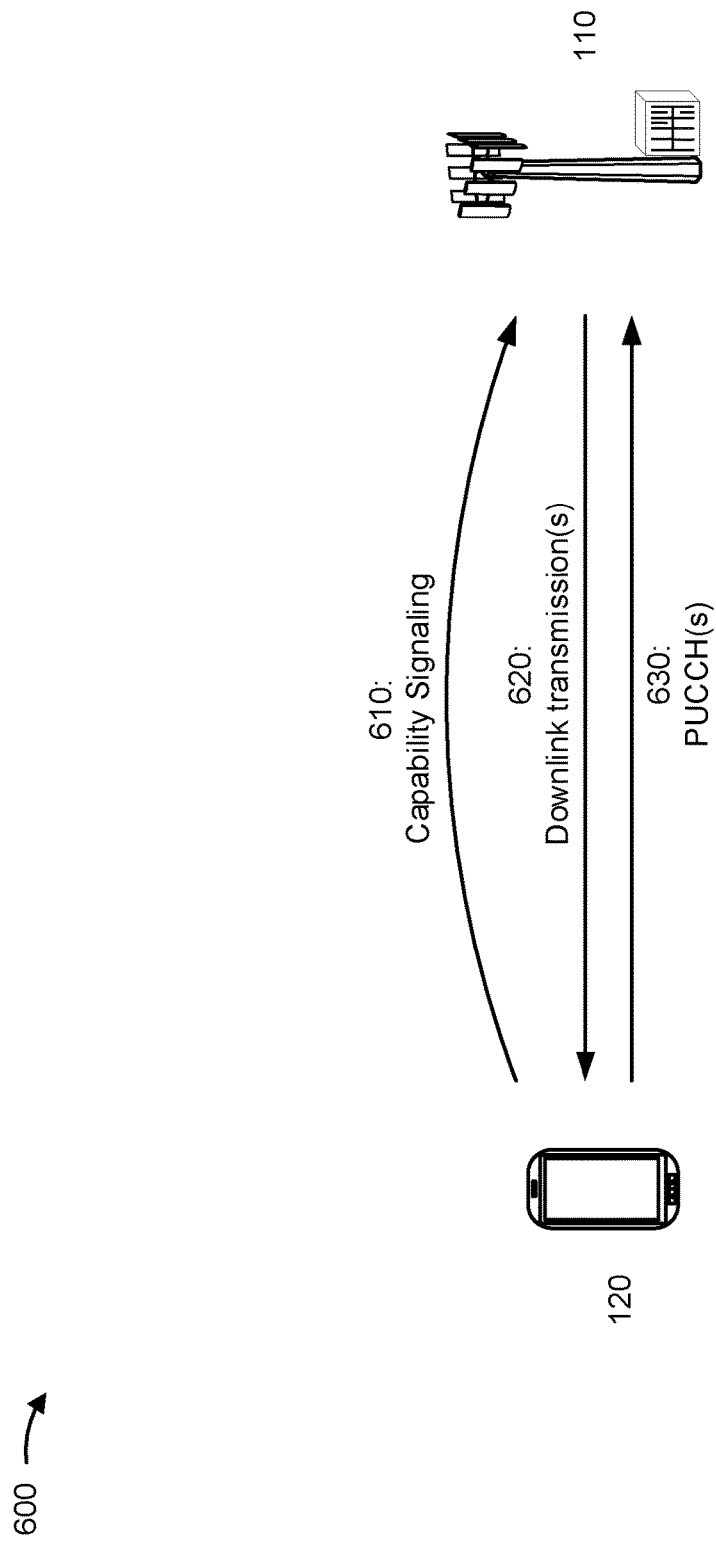
FIG. 6 is a diagram illustrating an example associated with physical uplink control channel (PUCCH) transmission for low latency communication deployments, in accordance with the present disclosure.

FIG. 6 is a diagram illustrating an example 600 associated with PUCCH transmission for low latency communication deployments, in accordance with the present disclosure. As shown in FIG. 6, example 600 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As further shown in FIG. 6, and by reference number 610, UE 120 may transmit capability signaling, such as a UE capability indicator or an FG with a particular format defined in a specification or some other fixed definition (e.g., a fixed format or a format fixed in relation to some other parameter). For example, UE 120 may transmit an FG indicating support for a particular type of symbol codebook, such as a 2×7-symbol HARQ ACK codebook or a 7×2-symbol HARQ ACK codebook with one PUCCH transmission per sub-slot. In this case, the FG may identify a particular communication format for a particular length configuration.

In some aspects, UE 120 may report separate capabilities. For example, when UE 120 supports a single sub-slot based HARQ ACK codebook, UE 120 may transmit separate reports, identifying a quantity of PUCCH transmissions per sub-slot and/or a set of formats for PUCCHs per sub-slot, for a 2×7-symbol codebook and for a 7×2-symbol codebook. Alternatively, UE 120 may report UE capabilities jointly. For example, when UE 120 supports a single sub-slot based HARQ ACK codebook, UE 120 may jointly report a quantity of PUCCH transmissions per sub-slot and/or a format of PUCCHs per sub-slot for a plurality of sub-slot based HARQ ACK codebooks (e.g., with different length configurations).

In some aspects, when UE 120 supports one slot based codebook and one sub-slot based codebook, UE 120 may transmit separate reports based at least in part on a type of the sub-slot codebook. For example, UE 120 may transmit a capability indicator identifying a quantity of PUCCHs per slot or a format of a PUCCH separately based at least in part on whether the sub-slot codebook is a 2×7-symbol codebook or a 7×2-symbol codebook. Alternatively, in some aspects, UE 120 may transmit joint capability information regardless of a type of the sub-slot codebook.

In some aspects, when UE 120 supports two sub-slot codebooks, UE 120 may transmit separate reports based at least in part on a type of the two sub-slot codebooks. For example, UE 120 may transmit separate reports based at least in part on whether the two sub-slot codebooks are two 2×7-symbol codebooks, two 7×2-symbol codebooks, or one 2×7-symbol codebook and one 7×2-symbol codebook. Alternatively, in some aspects, UE 120 may transmit joint capability information regardless of a type of the two sub-slot codebooks.

In some aspects, UE 120 may transmit a separate capability reporting based at least in part on a quantity of codebooks that are configured. For example, UE 120 may report a quantity of PUCCHs and formats of the PUCCHs, for 2×7-symbol and 7×2-symbol HARQ ACK codebooks, in separate capability messages based at least in part on whether a single codebook is configured or two codebooks are configured. In this case, UE 120 may transmit a single reporting for each codebook. Alternatively, in some aspects, UE 120 may transmit a joint capability indication regardless of the quantity of codebooks that are configured.

In some aspects, UE 120 may transmit a capability indication (e.g., an FG) identifying a quantity of SRs or HARQ ACKs that can be multiplexed per sub-slot. For example, UE 120 may transmit a first capability indication particular to a first codebook configuration (e.g., a 2×7-symbol codebook) and a second capability indication particular to a second codebook configuration (e.g., a 7×2-symbol codebook). Additionally, or alternatively, UE 120 may transmit a single capability indication applicable to a plurality (e.g., all) sub-slot based HARQ ACK codebooks. In some aspects, a quantity of iterations of multiplexing of SRs, HARQ ACKs, or CSI (a number of times that SR, HARQ ACK, or CSI can be multiplexed) may be fixed on a per slot basis and/or defined in a specification as a fixed quantity or a fixed relation to some other parameter.

As further shown in FIG. 6, and by reference number 620, UE 120 may receive one or more downlink transmissions. For example, UE 120 may receive a grant of resources for receiving a PDSCH. Additionally, or alternatively, UE 120 may receive a PDSCH on one or more resources. In some aspects, UE 120 may receive one or more downlink transmissions associated with the capability indication. For example, when UE 120 transmits an FG indicating a particular UE capability, UE 120 may receive one or more downlink transmissions associated with the particular UE capability. In this case, the one or more downlink transmissions may be associated with, for example, a quantity of PUCCHs in a sub-slot or a format of a set of PUCCHs in a sub-slot. In some aspects, B S 110 may configure the one or more downlink transmissions based at least in part on the UE capability indication. For example, UE 120 may receive a PDSCH for acknowledgement in accordance with a PUCCH configuration.

As further shown in FIG. 6, and by reference number 630, UE 120 may transmit one or more PUCCH communications. For example, UE 120 may transmit one or more multiplexed PUCCH communications. In this case, a quantity of PUCCHs conveying CSI and a quantity of instances of SRs, HARQ ACK messages, or CSI that may be multiplexed on a per-slot basis is fixed at a particular value. In some aspects, UE 120 may transmit the one or more PUCCH communications in accordance with the UE capability indication. For example, UE 120 may multiplex a plurality of PUCCHs, HARQ ACKs, or SRs, among other examples into a single signal and transmit the single signal on an uplink to BS 110.

As indicated above, FIG. 6 is provided as an example. Other examples may differ from what is described with respect to FIG. 6.

Figure 7:
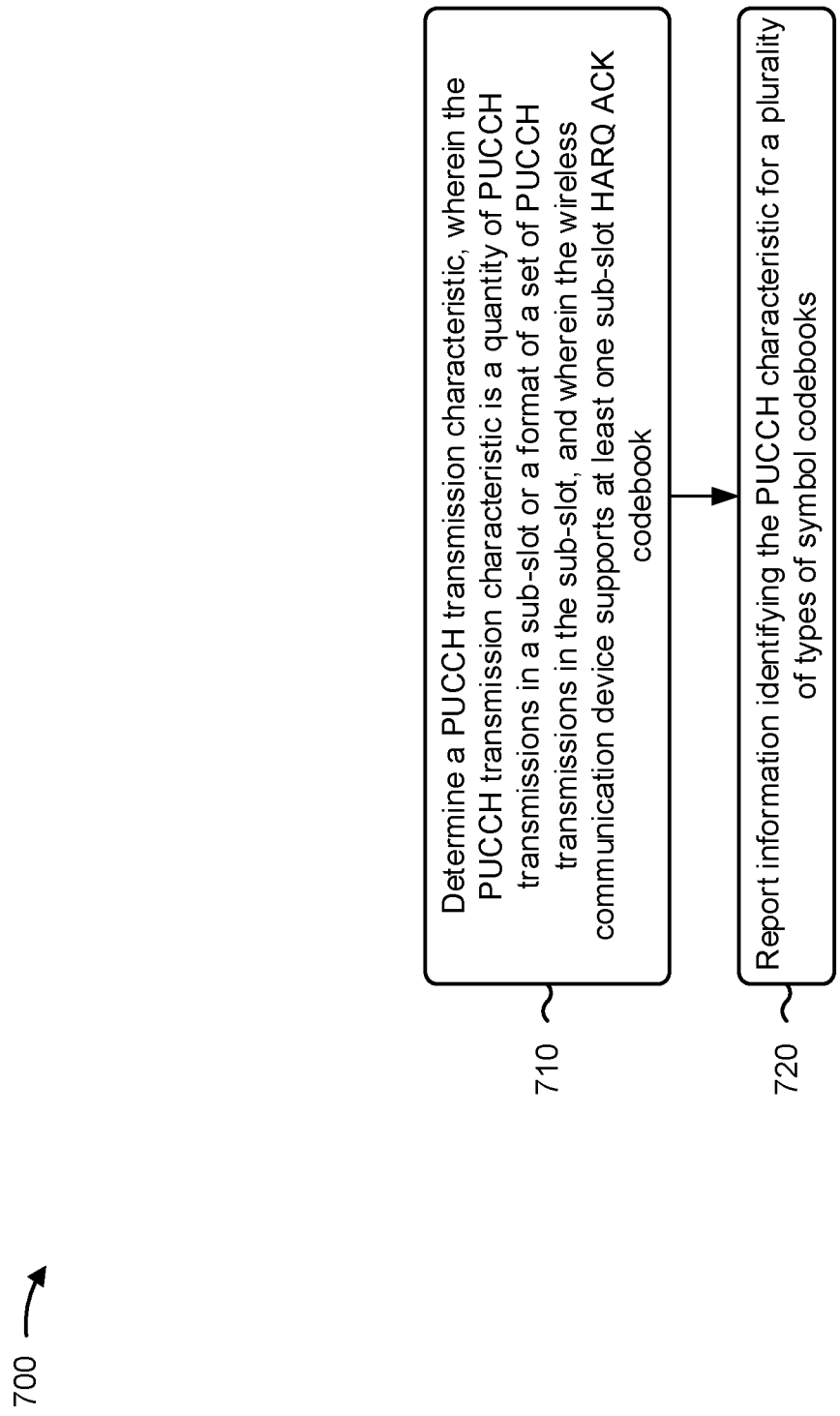
FIG. 7 is a diagram illustrating an example process associated with PUCCH transmission for low latency communication deployments, in accordance with the present disclosure.

FIG. 7 is a diagram illustrating an example process 700 performed, for example, by a wireless communication device, in accordance with the present disclosure. Example process 700 is an example where the wireless communication device (e.g., UE 120) performs operations associated with PUCCH transmission for low latency communication deployments.

As shown in FIG. 7, in some aspects, process 700 may include determining a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook (block 710). For example, the wireless communication device (e.g., using communication manager 140 and/or determination component 808, depicted in FIG. 8) may determine a PUCCH transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot HARQ ACK codebook, as described above. In some aspects, the PUCCH transmission characteristic is a quantity of PUCCH transmissions in a sub-slot or a format of a set of PUCCH transmissions in the sub-slot. In some aspects, the wireless communication device supports at least one sub-slot HARQ ACK codebook.

As further shown in FIG. 7, in some aspects, process 700 may include reporting information identifying the PUCCH characteristic for a plurality of types of symbol codebooks (block 720). For example, the wireless communication device (e.g., using communication manager 140 and/or reporting component 810, depicted in FIG. 8) may report information identifying the PUCCH characteristic for a plurality of types of symbol codebooks, as described above.

Process 700 may include additional aspects, such as any single aspect or any combination of aspects described below and/or in connection with one or more other processes described elsewhere herein.

In a first aspect, a quantity of PUCCH transmissions conveying channel state information and a quantity of iterations of multiplexing of scheduling requests, HARQ ACKs, or channel state information has a fixed definition.

In a second aspect, alone or in combination with the first aspect, a set of feature groups associated with the plurality of types of symbol codebooks has a fixed definition, and wherein at least one of the set of feature groups supports a 2×7-symbol codebook or a 7×2-symbol codebook with one PUCCH per sub-slot and one or more length configurations.

In a third aspect, alone or in combination with one or more of the first and second aspects, the wireless communication device supports a single sub-slot-based HARQ ACK codebook and is configured to report the PUCCH transmission characteristic separately for the plurality of types of symbol codebooks.

In a fourth aspect, alone or in combination with one or more of the first through third aspects, the wireless communication device supports a single sub-slot-based HARQ ACK codebook and is configured to report the PUCCH transmission characteristic jointly for the plurality of types of symbol codebooks and without regard to a length configuration.

In a fifth aspect, alone or in combination with one or more of the first through fourth aspects, the wireless communication device supports a slot-based HARQ ACK codebook and a sub-slot-based HARQ ACK codebook and is configured to report the PUCCH transmission characteristic separately for the plurality of types of symbol codebooks based at least in part on a symbol configuration of the sub-slot-based HARQ ACK codebook.

In a sixth aspect, alone or in combination with one or more of the first through fifth aspects, the wireless communication device supports a slot-based HARQ ACK codebook and a sub-slot-based HARQ ACK codebook and is configured to report the PUCCH transmission characteristic jointly for the plurality of types of symbol codebooks without regard to a symbol configuration of the sub-slot-based HARQ ACK codebook.

In a seventh aspect, alone or in combination with one or more of the first through sixth aspects, the wireless communication device supports two sub-slot-based HARQ ACK codebooks and is configured to report the PUCCH transmission characteristic separately based at least in part on a symbol configuration of the two sub-slot-based HARQ ACK codebooks.

In an eighth aspect, alone or in combination with one or more of the first through seventh aspects, the wireless communication device supports two sub-slot-based HARQ ACK codebooks and is configured to report the PUCCH transmission characteristic jointly for the plurality of types of symbol codebooks without regard to a symbol configuration of the two sub-slot-based HARQ ACK codebooks.

In a ninth aspect, alone or in combination with one or more of the first through eighth aspects, the wireless communication device is configured to report the PUCCH transmission characteristic separately regardless of a quantity of HARQ ACK codebooks that are configured.

In a tenth aspect, alone or in combination with one or more of the first through ninth aspects, the wireless communication device is configured to report the PUCCH transmission characteristic jointly based at least in part on a quantity of HARQ ACK codebooks that are configured.

In an eleventh aspect, alone or in combination with one or more of the first through tenth aspects, a first feature group is defined for a quantity of scheduling requests or HARQ ACKs that are multiplexed in a first code block configuration and a second feature group is defined for a quantity of scheduling requests or HARQ ACKs that are multiplexed in a second codebook configuration.

In a twelfth aspect, alone or in combination with one or more of the first through eleventh aspects, a single feature group is defined for a quantity of scheduling requests or HARQ ACKs that are multiplexed in all HARQ ACK codebooks.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
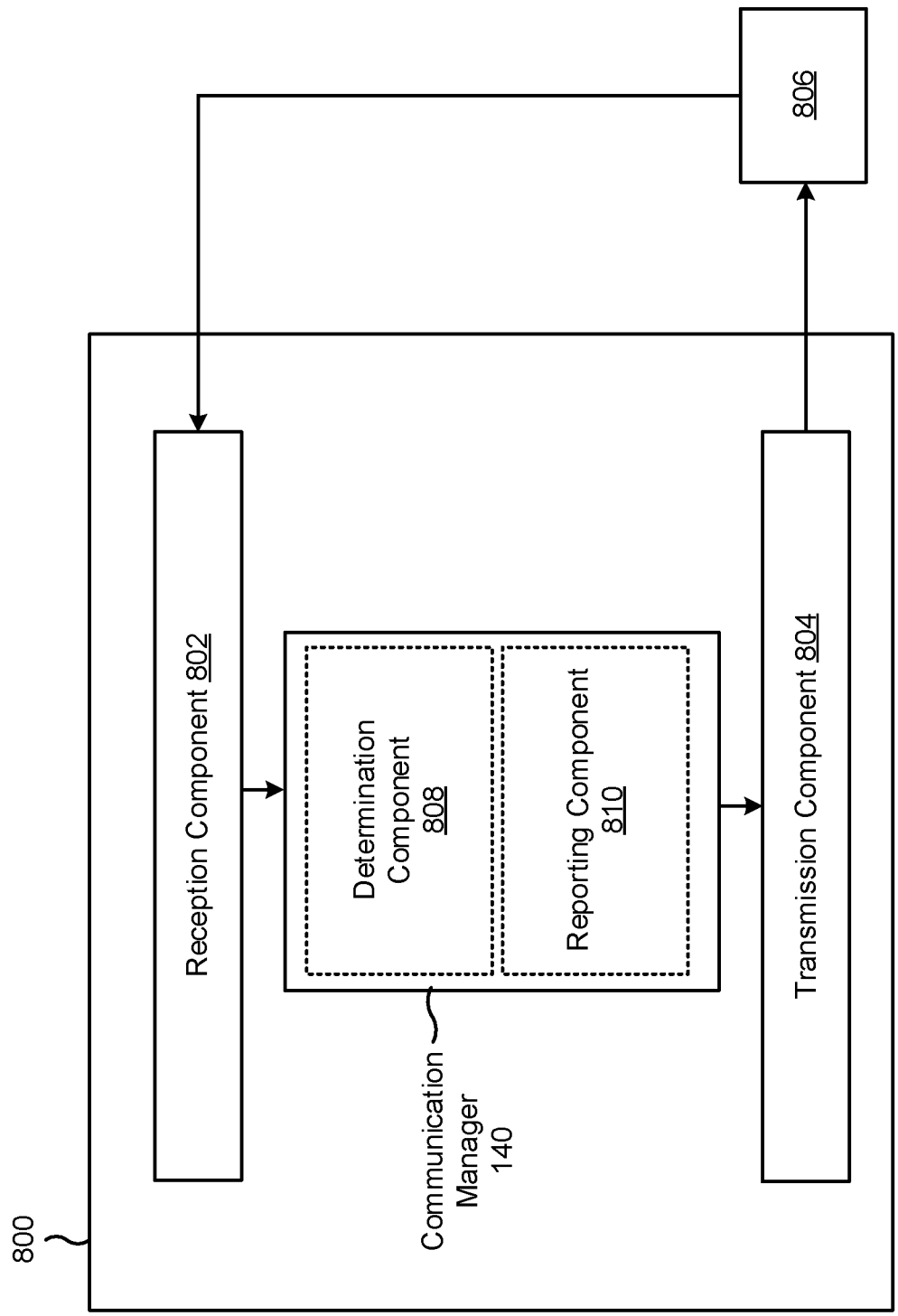
FIG. 8 is a block diagram of an example apparatus for wireless communication, in accordance with the present disclosure.

FIG. 8 is a block diagram of an example apparatus 800 for wireless communication. The apparatus 800 may be a wireless communication device, or a wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140) may include one or more of a determination component 808 or a reporting component 810, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the wireless communication device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described in connection with FIG. 2. In some aspects, the transmission component 804 may be co-located with the reception component 802 in a transceiver.

The determination component 808 may determine a PUCCH transmission characteristic wherein the PUCCH transmission characteristic is a quantity of PUCCH transmissions in a sub-slot or a format of a set of PUCCH transmissions in the sub-slot, and wherein the wireless communication device supports at least one sub-slot HARQ-ACK codebook. The reporting component 810 may report information identifying the PUCCH characteristic for a plurality of types of symbol codebooks.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a wireless communication device, comprising: determining a physical uplink control channel (PUCCH) transmission characteristic, wherein the PUCCH transmission characteristic is a quantity of PUCCH transmissions in a sub-slot or a format of a set of PUCCH transmissions in the sub-slot, and wherein the wireless communication device supports at least one sub-slot hybrid automatic repeat request (HARQ) acknowledgement (ACK) codebook; and reporting information identifying the PUCCH characteristic for a plurality of types of symbol codebooks.

Aspect 2: The method of Aspect 1, wherein a quantity of PUCCH transmissions conveying channel state information and a quantity of iterations of multiplexing of scheduling requests, HARQ ACKs, or channel state information has a fixed definition.

Aspect 3: The method of any of Aspects 1 to 2, wherein a set of feature groups associated with the plurality of types of symbol codebooks has a fixed definition, and wherein at least one of the set of feature groups supports a 2×7-symbol codebook or a 7×2-symbol codebook with one PUCCH per sub-slot and one or more length configurations.

Aspect 4: The method of any of Aspects 1 to 3, wherein the wireless communication device supports a single sub-slot-based HARQ ACK codebook and is configured to report the PUCCH transmission characteristic separately for the plurality of types of symbol codebooks.

Aspect 5: The method of any of Aspects 1 to 4, wherein the wireless communication device supports a single sub-slot-based HARQ ACK codebook and is configured to report the PUCCH transmission characteristic jointly for the plurality of types of symbol codebooks and without regard to a length configuration.

Aspect 6: The method of any of Aspects 1 to 5, wherein the wireless communication device supports a slot-based HARQ ACK codebook and a sub-slot-based HARQ ACK codebook and is configured to report the PUCCH transmission characteristic separately for the plurality of types of symbol codebooks based at least in part on a symbol configuration of the sub-slot-based HARQ ACK codebook.

Aspect 7: The method of any of Aspects 1 to 6, wherein the wireless communication device supports a slot-based HARQ ACK codebook and a sub-slot-based HARQ ACK codebook and is configured to report the PUCCH transmission characteristic jointly for the plurality of types of symbol codebooks without regard to a symbol configuration of the sub-slot-based HARQ ACK codebook.

Aspect 8: The method of any of Aspects 1 to 7, wherein the wireless communication device supports two sub-slot-based HARQ ACK codebooks and is configured to report the PUCCH transmission characteristic separately based at least in part on a symbol configuration of the two sub-slot-based HARQ ACK codebooks.

Aspect 9: The method of any of Aspects 1 to 8, wherein the wireless communication device supports two sub-slot-based HARQ ACK codebooks and is configured to report the PUCCH transmission characteristic jointly for the plurality of types of symbol codebooks without regard to a symbol configuration of the two sub-slot-based HARQ ACK codebooks.

Aspect 10: The method of any of Aspects 1 to 9, wherein the wireless communication device is configured to report the PUCCH transmission characteristic separately regardless of a quantity of HARQ ACK codebooks that are configured.

Aspect 11: The method of any of Aspects 1 to 10, wherein the wireless communication device is configured to report the PUCCH transmission characteristic jointly based at least in part on a quantity of HARQ ACK codebooks that are configured.

Aspect 12: The method of any of Aspects 1 to 11, wherein a first feature group is defined for a quantity of scheduling requests or HARQ ACKs that are multiplexed in a first code block configuration and a second feature group is defined for a quantity of scheduling requests or HARQ ACKs that are multiplexed in a second codebook configuration.

Aspect 13: The method of any of Aspects 1 to 12, wherein a single feature group is defined for a quantity of scheduling requests or HARQ ACKs that are multiplexed in all HARQ ACK codebooks.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
    one or more memories; and
    one or more processors, coupled to the one or more memories, configured to:
        determine a physical uplink control channel (PUCCH) transmission characteristic,
            wherein the PUCCH transmission characteristic is a quantity of PUCCH transmissions in a sub-slot or a PUCCH format of a set of PUCCH transmissions in the sub-slot, and
        wherein the wireless communication device supports at least one sub-slot hybrid automatic repeat request (HARQ) acknowledgement (ACK) codebook, the at least one sub-slot HARQ ACK codebook comprising a symbol configuration; and
        report information identifying the PUCCH transmission characteristic for the at least one sub-slot HARQ ACK codebook in accordance with the symbol configuration.

2. The wireless communication device of claim 1, wherein a quantity of PUCCH transmissions conveying channel state information and a quantity of iterations of multiplexing of scheduling requests, HARQ ACKs, or channel state information has a fixed definition.

3. The wireless communication device of claim 1, wherein the symbol configuration corresponds to a set of feature groups having a fixed definition, and
    wherein at least one of the set of feature groups supports a 2×7-symbol codebook or a 7×2-symbol codebook with one PUCCH per sub-slot and one or more length configurations.

4. The wireless communication device of claim 1, wherein the wireless communication device supports a single sub-slot-based HARQ ACK codebook and is configured to report the PUCCH transmission characteristic separately for a plurality of types of symbol codebooks.

5. The wireless communication device of claim 1, wherein the wireless communication device supports a single sub-slot-based HARQ ACK codebook and is configured to report the PUCCH transmission characteristic jointly for a plurality of types of symbol codebooks and without regard to a length configuration.

6. The wireless communication device of claim 1, wherein the wireless communication device supports a slot-based HARQ ACK codebook and a sub-slot-based HARQ ACK codebook and is configured to report the PUCCH transmission characteristic separately for a plurality of types of symbol codebooks based at least in part on the symbol configuration.

7. The wireless communication device of claim 1, wherein the wireless communication device supports a slot-based HARQ ACK codebook and a sub-slot-based HARQ ACK codebook and is configured to report the PUCCH transmission characteristic jointly for a plurality of types of symbol codebooks without regard to the symbol configuration.

8. The wireless communication device of claim 1, wherein the wireless communication device supports two sub-slot-based HARQ ACK codebooks and is configured to report the PUCCH transmission characteristic separately based at least in part on the symbol configuration.

9. The wireless communication device of claim 1, wherein the wireless communication device supports two sub-slot-based HARQ ACK codebooks and is configured to report the PUCCH transmission characteristic jointly for a plurality of types of symbol codebooks without regard to the symbol configuration.

10. The wireless communication device of claim 1, wherein the wireless communication device is configured to report the PUCCH transmission characteristic separately regardless of a quantity of HARQ ACK codebooks that are configured.

11. The wireless communication device of claim 1, wherein the wireless communication device is configured to report the PUCCH transmission characteristic jointly based at least in part on a quantity of HARQ ACK codebooks that are configured.

12. The wireless communication device of claim 1, wherein a first feature group is defined for a quantity of scheduling requests or HARQ ACKs that are multiplexed in a first codebook configuration and a second feature group is defined for a quantity of scheduling requests or HARQ ACKs that are multiplexed in a second codebook configuration.

13. The wireless communication device of claim 1, wherein a single feature group is defined for a quantity of scheduling requests or HARQ ACKs that are multiplexed in all HARQ ACK codebooks.

14. A method of wireless communication performed by a wireless communication device, comprising:
   determining a physical uplink control channel (PUCCH) transmission characteristic,
      wherein the PUCCH transmission characteristic is a quantity of PUCCH transmissions in a sub-slot or a PUCCH format of a set of PUCCH transmissions in the sub-slot, and
      wherein the wireless communication device supports at least one sub-slot hybrid automatic repeat request (HARQ) acknowledgement (ACK) codebook, the at least one sub-slot HARQ ACK codebook comprising a symbol configuration; and
   reporting information identifying the PUCCH transmission characteristic for the at least one sub-slot HARQ ACK codebook in accordance with the symbol configuration.

15. The method of claim 14, wherein a quantity of PUCCH transmissions conveying channel state information and a quantity of iterations of multiplexing of scheduling requests, HARQ ACKs, or channel state information has a fixed definition.

16. The method of claim 14, wherein the symbol configuration corresponds to a set of feature groups having a fixed definition, and
   wherein at least one of the set of feature groups supports a 2×7-symbol codebook or a 7×2-symbol codebook with one PUCCH per sub-slot and one or more length configurations.

17. The method of claim 14, wherein the wireless communication device supports a single sub-slot-based HARQ ACK codebook and is configured to report the PUCCH transmission characteristic separately for a plurality of types of symbol codebooks.

18. The method of claim 14, wherein the wireless communication device supports a single sub-slot-based HARQ ACK codebook and is configured to report the PUCCH transmission characteristic jointly for a plurality of types of symbol codebooks and without regard to a length configuration.

19. The method of claim 14, wherein the wireless communication device supports a slot-based HARQ ACK codebook and a sub-slot-based HARQ ACK codebook and is configured to report the PUCCH transmission characteristic separately for a plurality of types of symbol codebooks based at least in part on the symbol configuration.

20. The method of claim 14, wherein the wireless communication device supports a slot-based HARQ ACK codebook and a sub-slot-based HARQ ACK codebook and is configured to report the PUCCH transmission characteristic jointly for a plurality of types of symbol codebooks without regard to the symbol configuration.

21. The method of claim 14, wherein the wireless communication device supports two sub-slot-based HARQ ACK codebooks and is configured to report the PUCCH transmission characteristic separately based at least in part on the symbol configuration.

22. The method of claim 14, wherein the wireless communication device supports two sub-slot-based HARQ ACK codebooks and is configured to report the PUCCH transmission characteristic jointly for a plurality of types of symbol codebooks without regard to a symbol configuration.

23. The method of claim 14, wherein the wireless communication device is configured to report the PUCCH transmission characteristic separately regardless of a quantity of HARQ ACK codebooks that are configured.

24. The method of claim 14, wherein the wireless communication device is configured to report the PUCCH transmission characteristic jointly based at least in part on a quantity of HARQ ACK codebooks that are configured.

25. The method of claim 14, wherein a first feature group is defined for a quantity of scheduling requests or HARQ ACKs that are multiplexed in a first codebook configuration and a second feature group is defined for a quantity of scheduling requests or HARQ ACKs that are multiplexed in a second codebook configuration.

26. The method of claim 14, wherein a single feature group is defined for a quantity of scheduling requests or HARQ ACKs that are multiplexed in all HARQ ACK codebooks.

27. A non-transitory computer-readable medium storing a set of instructions for wireless communication, the set of instructions comprising:
   one or more instructions that, when executed by one or more processors of a wireless communication device, cause the wireless communication device to:
      determine a physical uplink control channel (PUCCH) transmission characteristic,
         wherein the PUCCH transmission characteristic is a quantity of PUCCH transmissions in a sub-slot or a PUCCH format of a set of PUCCH transmissions in the sub-slot, and
         wherein the wireless communication device supports at least one sub-slot hybrid automatic repeat request (HARQ) acknowledgement (ACK) codebook, the at least one sub-slot HARQ ACK codebook comprising a symbol configuration; and
      report information identifying the PUCCH transmission characteristic for the at least one sub-slot HARQ ACK codebook in accordance with the symbol configuration.

28. The non-transitory computer-readable medium of claim 27, wherein a quantity of PUCCH transmissions conveying channel state information and a quantity of iterations of multiplexing of scheduling requests, HARQ ACKs, or channel state information has a fixed definition.

29. The non-transitory computer-readable medium of claim 27, wherein the symbol configuration corresponds to a set of feature groups having a fixed definition, and
   wherein at least one of the set of feature groups supports a 2×7-symbol codebook or a 7×2-symbol codebook with one PUCCH per sub-slot and one or more length configurations.

30. An apparatus for wireless communication, comprising:
   means for determining a physical uplink control channel (PUCCH) transmission characteristic,
      wherein the PUCCH transmission characteristic is a quantity of PUCCH transmissions in a sub-slot or a PUCCH format of a set of PUCCH transmissions in the sub-slot, and
      wherein the apparatus supports at least one sub-slot hybrid automatic repeat request (HARQ) acknowledgement (ACK) codebook, the at least one sub-slot HARQ ACK codebook comprising a symbol configuration; and means for reporting information identifying the PUCCH transmission characteristic for the at least one sub-slot HARQ ACK codebook in accordance with the symbol configuration.

\* \* \* \* \*